July 15, 1941.　　　D. E. MARSHALL　　　2,249,152
OVEN
Filed Jan. 31, 1940　　　12 Sheets-Sheet 2

FIG. 2

INVENTOR
DONALD E. MARSHALL
BY
ATTORNEYS

July 15, 1941.  D. E. MARSHALL  2,249,152
OVEN
Filed Jan. 31, 1940  12 Sheets-Sheet 6

FIG. 7.

Donald E. Marshall
BY
Toulmin & Toulmin

July 15, 1941. D. E. MARSHALL 2,249,152
OVEN
Filed Jan. 31, 1940 12 Sheets-Sheet 7

INVENTOR
DONALD E. MARSHALL
BY
ATTORNEY

July 15, 1941.  D. E. MARSHALL  2,249,152
OVEN
Filed Jan. 31, 1940  12 Sheets-Sheet 8

Inventor
DONALD E. MARSHALL
by Toulmin & Toulmin
Attorneys

July 15, 1941.  D. E. MARSHALL  2,249,152
OVEN
Filed Jan. 31, 1940  12 Sheets-Sheet 9

Inventor
Donald E. Marshall
by Toulmin & Toulmin
Attorneys

July 15, 1941.  D. E. MARSHALL  2,249,152
OVEN
Filed Jan. 31, 1940  12 Sheets-Sheet 10

Donald E. Marshall,
By Toulmin & Toulmin
Attorneys

July 15, 1941.　　　D. E. MARSHALL　　　2,249,152
OVEN
Filed Jan. 31, 1940　　　12 Sheets-Sheet 11

Inventor
DONALD E. MARSHALL
by Toulmin & Toulmin
Attorneys

Patented July 15, 1941

2,249,152

UNITED STATES PATENT OFFICE 2,249,152

OVEN

Donald E. Marshall, Battle Creek, Mich., assignor to Kellogg Company, Battle Creek, Mich., a corporation of Delaware Application January 31, 1940, Serial No. 316,524

2 Claims. (Cl. 107—57)

The present invention relates to ovens for the baking of edible products.

One of the objects of this invention is to so bake cereal of a flaky character, such as corn or rice flakes, as to prevent the breakage of the fragile flakes during the course of baking to prevent the accumulation of flakes or pieces of flakes in the conveying mechanism or elsewhere, and to bring about the baking by tossing of the flakes while being baked by the use of air so as to not break the flakes.

It is an additional object to provide means of transferring the flakes by gravity, in the presence of air, to cushion their descent without mechanical means for moving the flakes and thereby prevent breaking the flakes.

It is a further object to provide means for both baking the flakes and for cooling the flakes so that they may be delivered in cooled condition.

It is an additional object to provide means of circulating clean heated air through the continuously moving containers for flakes, and over and around the flakes, and of arranging the intake and exhaust in zones so that as the flakes progress through the oven the temperature and moisture in each zone may be independently adjusted so that a careful regulation of temperature and moisture content may be effected.

Other objects are to provide an improved mechanism by which the inclosures or baskets containing the flakes are moved progressively through the oven and are later moved progressively through the cooling compartment; to provide a mechanism by which the flaky material is moved not only from one side of each basket to the other side, but also from one end of each basket to the opposite end thereof and vice versa; to improve the burner control whereby the flakes are subjected to a more even temperature during movement through the oven; and finally to introduce the heated air to each basket in an efficient manner from a common inlet chamber.

This application is a continuation in part of my application Ser. No. 247,936, filed December 27, 1938, and assigned to the same assignee as the present invention.

The above objects are carried out, in brief, and in accordance with the improvements set forth in this application, by arranging the heated air inlet to the individual basket in such a manner that as the baskets pass over the inlets the flaky contents of each basket are caused to be tossed from one side of the basket to the other, and also from one end to the other end of the basket. For this purpose the inlet orifices are arranged in staggered relation so as to maintain an agitation of the flakes in several different directions as the basket proceeds to move through the oven. The movement of the flakes is reversed as the baskets pass over the succeeding heated air inlets. The baskets are mounted on rollers which are provided with an improved arrangement for lubrication. Instead of heating the combined air and its flaky content before returning the air to the oven, as disclosed in my application referred to above, I separate the cereal particles from the air and then heat solely the latter before returning the same to the oven. In this manner certain economies of operation are effected.

Other objects and features will be apparent as the following specification is perused in connection with the accompanying drawings.

Figure 1:
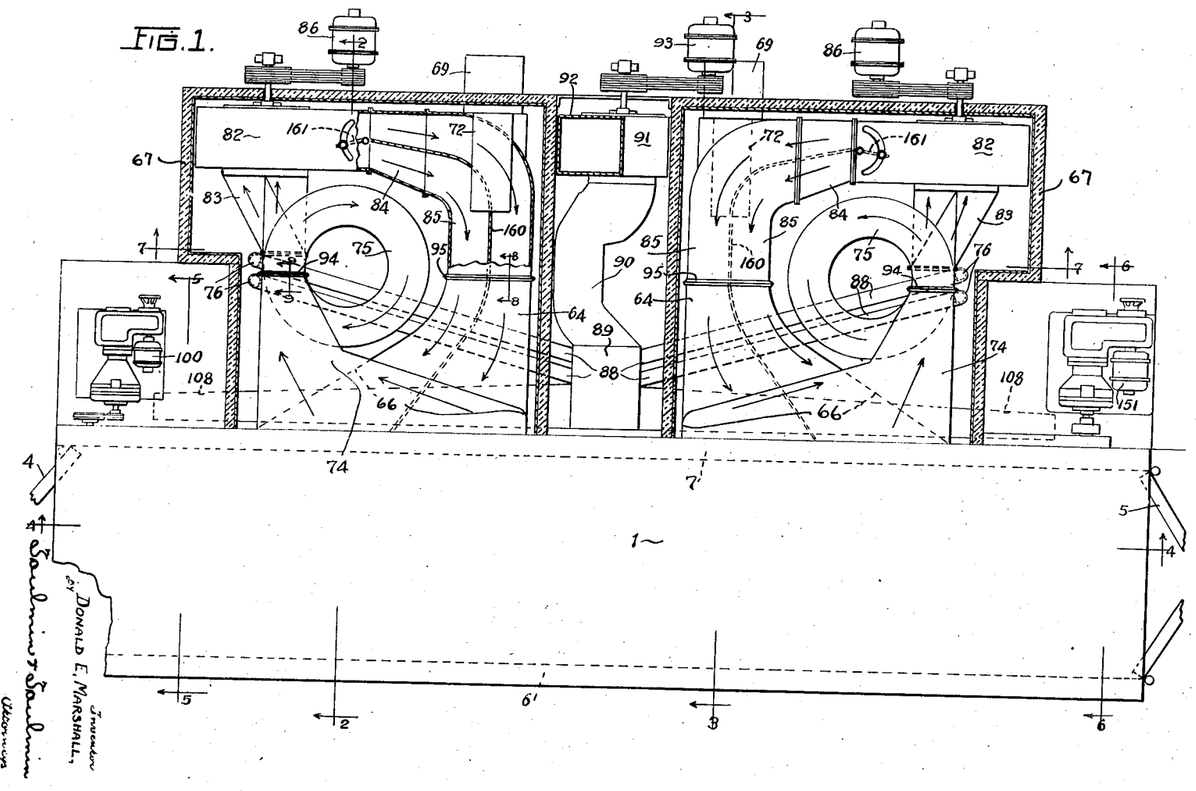
Figure 1 is a plan view, partly in section, of the entire machine including the oven and the device for separating the fines or small particles of cereal from the larger flakes.
Figures 4, 8, 9:
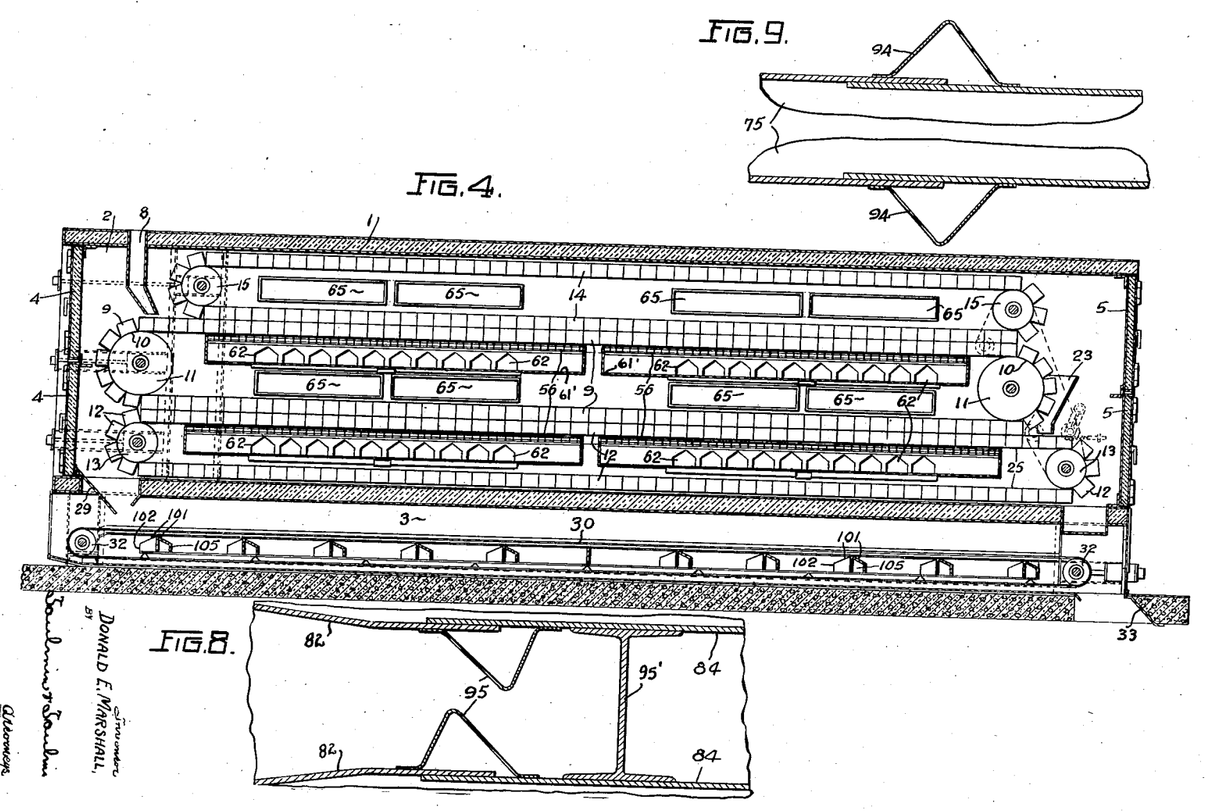
Figure 4 is a longitudinal section of the entire machine showing the different flights of the cereal-containing baskets and the cooler compartment.
Figure 8 is a fragmentary sectional view taken along the line 8—8 in Figure 1, and showing the flexible extension between two opposite lengths of a pair of adjacently positioned pipe couplings of rectangular configuration.
Figure 9 is a fragmentary sectional view taken along the line 9—9 in Figure 1, to show a flexible coupling between a pair of aligned conduits.

Referring to the drawings in detail, 1 designates the top of the oven, the interior of which is generally designated 2, which indicates the baking compartment, while the numeral 3 indicates the cooling compartment (Figure 4). This baking compartment is provided with suitable end walls 4 and 5 and side walls 6 and 7. The end walls may be formed as a pair of doors, hinged at their edges to the side walls for inspecting the oven, as is indicated in Figure 1. The flakes in unbaked condition are supplied through a chute 8 (Figure 4), where they are deposited in the baskets 9. The tops of these baskets at this point are open.

Figures 5, 6:
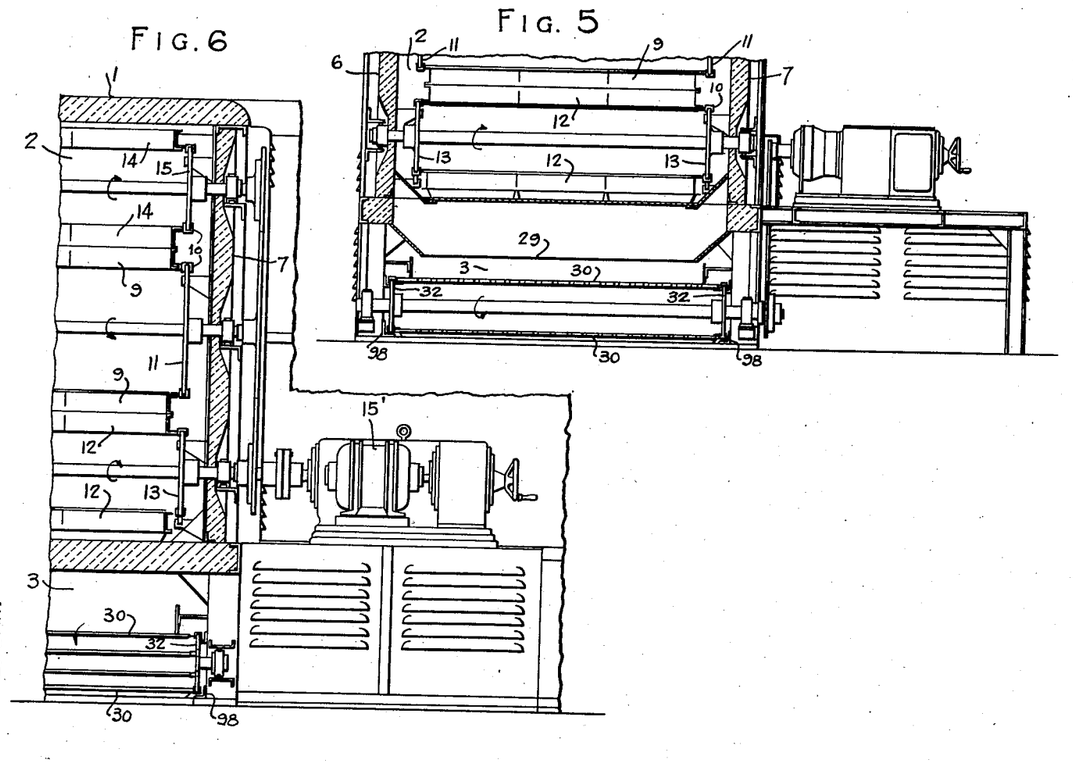
Figure 5 is a sectional view taken along the line 5—5 in Figure 1, to show among other things, the relative position of the motor which drives the cooling conveyor.
Figure 6 is a sectional view taken along the line 6—6 in Figure 1, to show the relative position of the motor for driving the oven conveyors.

The baskets 9 are mounted on chains 10 (Figure 25) at either end. They pass around sprockets 11, as shown in Figure 4, and become the tops of the baskets 12, of similar type, which are likewise carried on chains that move around the sprockets 13. The baskets 9 and 12 constitute the so-called middle and lower flights of the oven. The upper flight also employs baskets 14, mounted on the chains 10 which rotate on the sprockets 15. The sprockets 11, 13 and 15 are driven in any suitable manner, for example, by means of a motor 15' (Figure 6), connected through suitable reduction gearing. As is further seen in Figure 6, the sprockets are mounted on shafts which extend across the width of the oven and journalled preferably in ball bearings secured to the frame of the machine in any suitable manner. It will be noted in Figure 4 that the length of the upper flight of baskets is somewhat less than the middle and lower flights, the reason being that the upper flight of baskets serves merely as a cover for the middle flight, and furthermore the extreme left-hand group of baskets 9 of the middle flight, as shown in Figure 4, must be left open at the top to receive the unbaked cereal flakes from the chute 8.

*Baskets and oven conveyors*

Each of the baskets consists of a solid metal box in that the side walls 16 (Figure 24) and the end walls are of solid metal. The bottom of each basket is either of perforated metal or formed of wire mesh, as at 17. When the basket 9 is inverted its bottom 17 becomes the top of the composite basket. The two baskets interengage at their top surfaces 18, as is indicated at the lower part of Figure 24. Thus the baskets are completely in communication with one another through their open tops. The sides of adjacent baskets engage only in the sense that the sides may touch one another as the baskets travel with the chains, but in general there is a small space left between the sides of adjacent baskets, as is clearly shown in Figure 24. The corresponding side of each basket is provided with a flange 20, and the opposite side of each basket is turned over, as at 21. Thus a free space between the side walls of the baskets is assured so that flakes will not be caught between these walls and crushed, broken or burned. This provides a self-cleaning construction. As air pressure is present on the outside of the baskets as well as the inside, as will be explained hereinafter, the circulation of air tends to clean and keep clear the space between the side flanges so as to prevent this entrapment of the flakes.

When the flakes have passed from left to right, in Figure 4, at the end of that flight the baskets 14 and 9 move away from one another so as to uncover the basket 9. Each basket 9 on the chains 10, as the baskets pass around the end of the conveyor over the sprocket 11, opens up for the dual purpose of releasing any entrapped flakes, and particularly for the purpose of dumping the contents into the chute 23. This chute guides the flakes, which thus descend in the oven without mechanical handling, into the baskets 12, which are mounted on chains 25 passing over the sprocket 13. In this manner the baskets 9 are loaded with the flakes, and after loading the baskets 9 are now inverted and become the covers of the baskets 12, or the upper half of the baskets. The composite basket formed of baskets 9 and 12 then proceeds from right to left. At the left-hand end (Figure 4) the baskets again separate, the baskets 9 passing upwardly over the sprocket 11 and the baskets 12 passing downwardly over the sprocket 13. The flakes in the baskets 12 are then dumped into the air, through the chute 29, onto the articulated perforated plate 30 in the cooling conveyor compartment 3. These plates are mounted upon the chains 31, which in turn, are carried on the sprockets 32. The perforated plate conveyor 30 conveys the flakes from the left-hand end to the right-hand end, whence they are dumped into the air through the chute 33 to the next processing machine in line.

Figures 17, 18, 19:
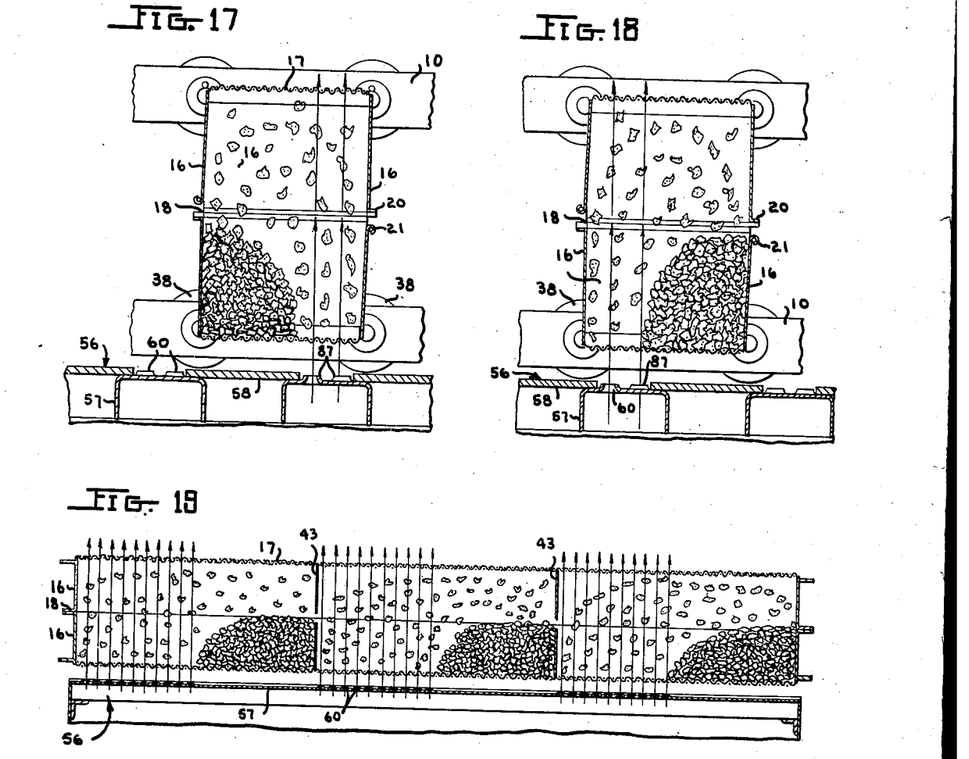
Figures 17 and 18 are diagrams indicating the manner in which a double basket of cereal passes over the perforations in the baffle plate shown in Figure 13 to cause the flakes to move from one side of the basket to the other side, and then back again. This movement is a tossing action.
Figures 19 and 20 are views similar to Figures 17 and 18, but instead show the manner in which the double baskets pass over the perforations in the baffle plate to cause a longitudinal movement or tossing of the flakes from one end of the basket to the other, and then a reverse movement.
Figure 20:
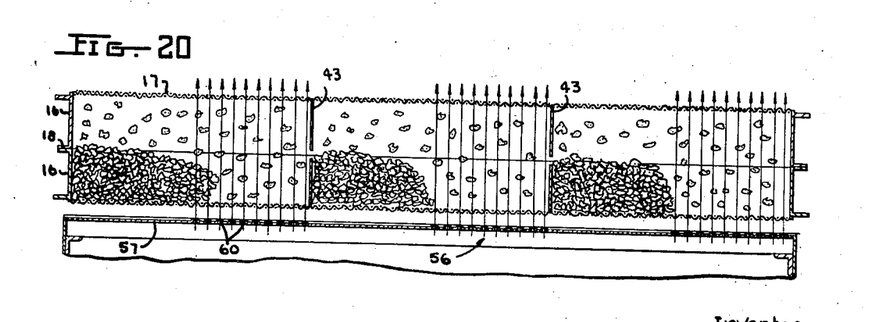
Figures 24, 25, 26, 27:
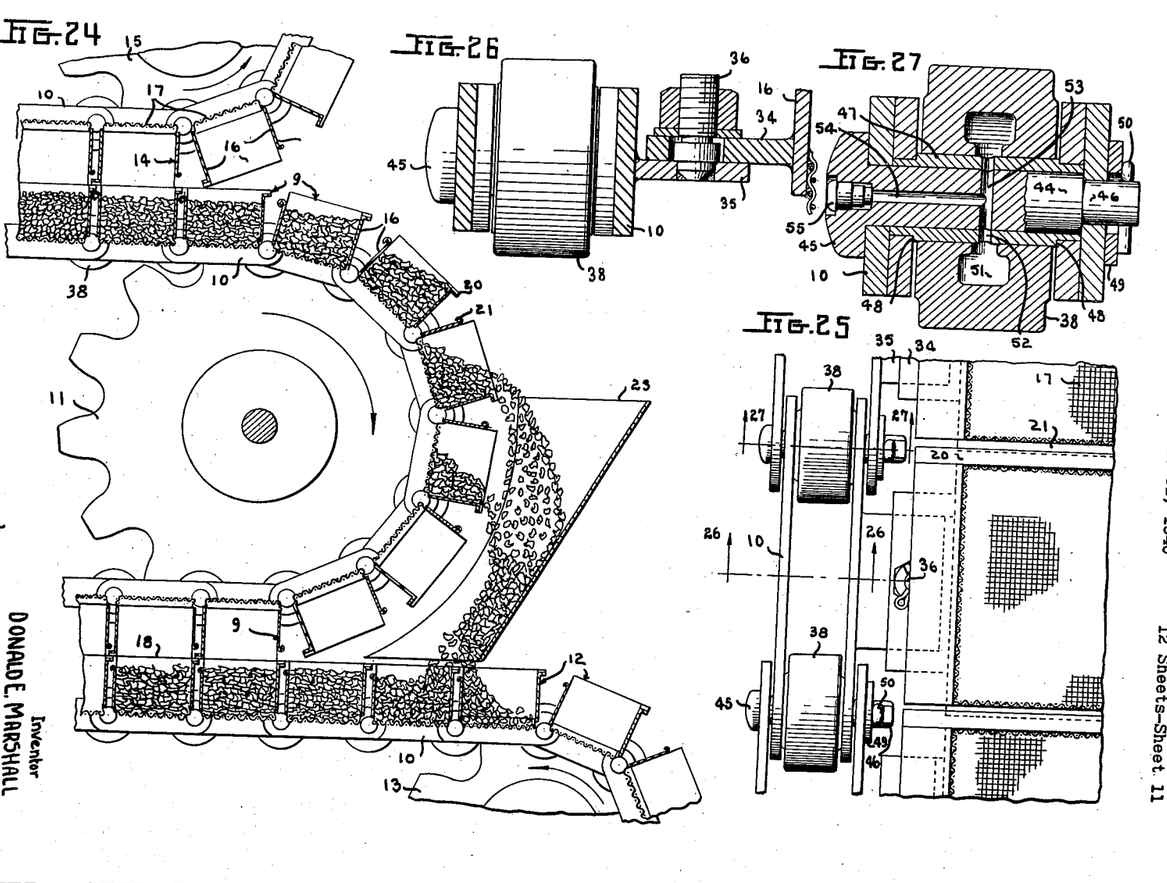
Figure 24 is an enlarged view of the baskets and the driving chain and sprocket, and the manner in which the baskets of the upper flight empty into the baskets of the lower flight. This figure is an enlarged view of the mechanism shown to the extreme right of Figure 4.
Figure 25 is a partial plan view of the baskets and the supporting rollers and chain, showing the manner of connection between the baskets and the chain.
Figure 26 is a sectional view taken along the line 26—26 of Figure 25, showing the details of the connection between the baskets and the driving chain.
Figure 27 is a sectional view taken along the line 27—27 of Figure 25, to show the details of the basket rollers.

Returning to the baskets, it will be observed that the ends of the baskets are provided with flanges 34 for mounting the baskets on the side plates 35 and attaching them through the bolts 36 (Figure 26). The plates 35 extend inwardly from the chains 10, referred to hereinbefore. These chains are provided with smooth surface rollers 38 on the left-hand end, riding on the tracks 39 (Figure 3), and grooved rollers 40 on the right-hand end, riding on the tracks 41 carried on the brackets 42. The baskets are provided preferably with two transverse partitions 43, equi-distantly spaced and intermediate their ends (Figures 19 and 20). The purpose of these partitions will appear later. In order that the rollers 38, 40 will rotate with as little friction as possible, I have provided an improved roller and bearing mechanism which is shown in Figure 27.

The links of the chains are indicated at 10 and are carried on an axle 44 having a head 45 and a studded end 46. Directly over the axle 44 there is a bushing 47 of bearing material, which fits within the bore of the rollers 38, 40. This bushing is provided with a shouldered portion 48 at each end, on which the links of the chains 10 rotate. The outer links of the chains rotate directly on the axle 44 or on the stud 46. There is a washer 49 and a pin 50 holding the chains and the roller on the axle. Each roller is provided with an interior core 51, to which access is made through an opening 52 in the bushing, a transverse opening 53 in the axle and an opening 54 which extends longitudinally of the axle through the head 45. The opening 54 terminates preferably in an Alemite connection, as indicated at 55. Thus heavy oil or grease may be introduced through the Alemite connection into the cored-out portion 51, which serves as a reservoir for a permanent and continual lubrication of the rotating surfaces between the roller and the axle and between the latter and the links of the chains.

*Air circulation structure of the oven*

Figure 13:
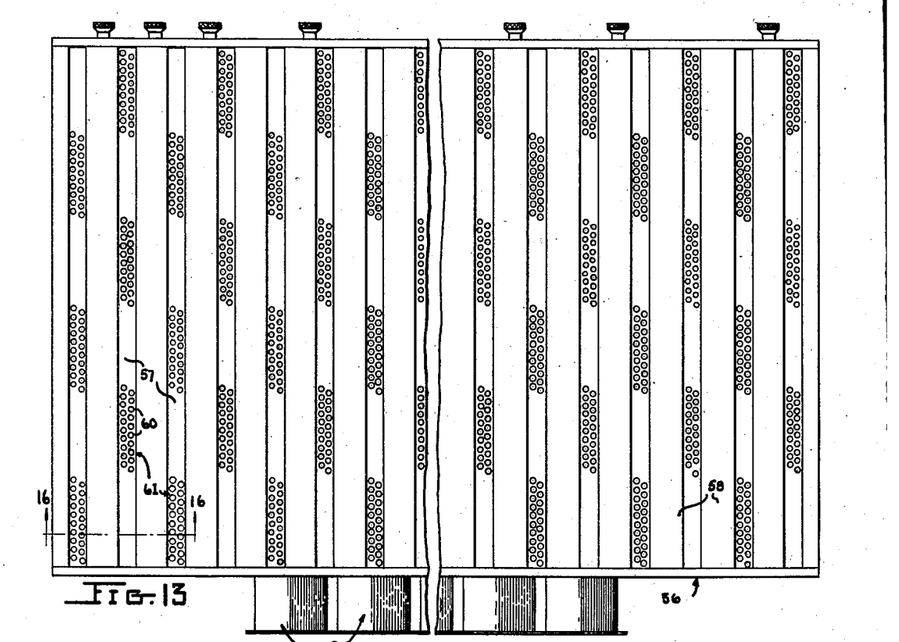
Figure 13 is a plan view of the perforated baffle plate in the oven.
Figure 14:
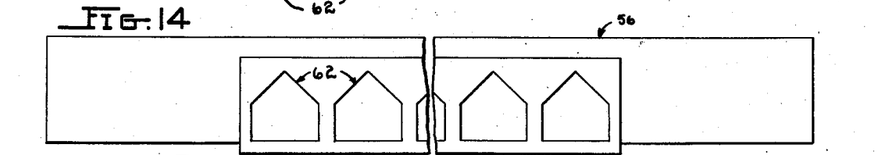
Figure 14 is a view looking at the end of the baffle plate shown in Figure 13, and illustrating the heated air inlet ducts.
Figure 16:
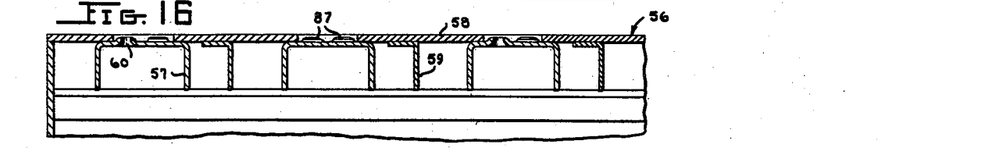
Figure 16 is a sectional view taken along the line 16—16 of Figure 13, to show the details of the heated air ducts which extend across the baffle plate shown in Figure 13.

Secured in any suitable manner from the side and end walls of the oven, and positioned directly under the intermediate and lower flights of baskets, there are two pairs of baffle plates, indicated generally at 56 (Figure 13), which extend substantially over the horizontal portion of the travel of the baskets 9, 12 and 14. These baffle plates are shown in detail in Figure 16, and are composed of inverted U-shaped sections 57, to the edges of which are secured flat plate sections 58 to form a substantially linear surface. The flat portion of the U-shaped section 57 is provided with alternate groups of perforated portions, the perforations being indicated at 61 (Figure 13). Thus, looking down on the baffle plate 56, one would see strips extending crosswise of the plate, each strip having a number of groups of perforations separated by unperforated portions. The perforated groups are arranged in staggered relation for purposes which will appear presently, as also the perforations within each group.

Each of the baffle plates 56 comprises the top member of a box-like compartment 61', which is closed on all sides except at the top where the openings 60 are provided. These compartments 61' may be secured to the sides of the oven in any suitable manner. Extending from one edge of each compartment 61' there are a number of relatively small gable-roofed conduits 62 and in the drawings five such conduits are shown for each compartment 61'. The conduits 62 project out through the side wall of the oven.

In addition to the openings which receive the conduits 62, the side wall of the oven is provided with rectangular openings 65 which are positioned in vertical alignment with the conduits 62. There are two such openings provided for each group of conduits 62 and these openings are spaced from their corresponding conduits 62 by one of the flights of baskets. The general arrangement is best seen in Figure 4 and this arrangement is such that heated air can be forced through the conduit 62 into the oven, then upwardly through the baskets positioned immediately above and moving with the chains 10, whereupon this air is exhausted out of the oven through the nearest opening 65. The heated air enters the conduit 62 through a pipe 66 (Figure 1), which is contained in a large rectangular chamber 67. This pipe represents the exit or outlet of a recirculatory system, including a blower, a burner and a centrifugal fines separator and collector, all of which will be described in detail hereinafter. The exhaust openings 65 are similarly connected to a pipe 74 which is also contained in one of the compartments 67 and represents the inlet of the recirculatory system referred to above. The recirculatory character of the pipe system contained in the compartment 67 and terminating in the pipes 66 and 74 is indicated in Figure 1 by the arrows. Inasmuch as each group of intake ducts 62 and also each pair of outlet ducts 65 take on a rectangular configuration, the pipes 66 and 74 to which these ducts are respectively connected are also of a rectangular shape.

Figure 2:
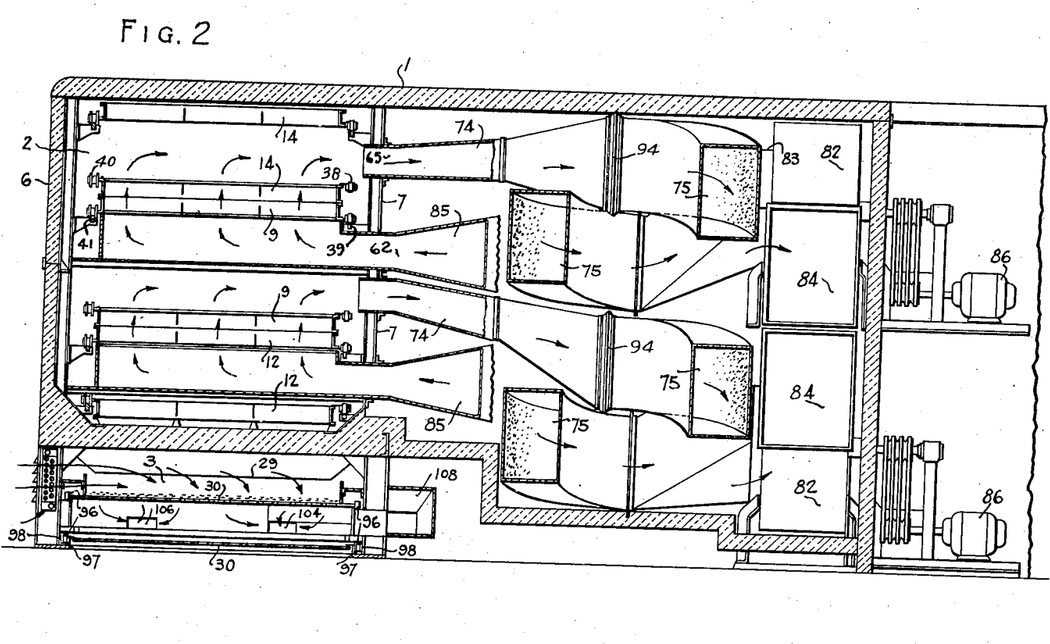
Figure 2 is a sectional view taken along the line 2—2 in Figure 1, looking in the direction of the arrows. This figure is a view across the entire width of the oven and the fines-separating apparatus.

Inasmuch as there are in effect four complete sets of intake conduits 62 and exhaust conduits 65 there are provided two compartments 67, but each compartment comprises two separate recirculatory systems as shown most clearly in Figure 2. Each system comprises its own blower, burner and fines separator and collector. To this end each compartment 67 is provided with a pair of vertically positioned openings 68 in the end wall of the compartment for receiving any suitable form of burner for the function of heating the air as it is passed through the recirculatory system. This burner may be of the so-called "Eclipse" type and comprises the chamber 69 into which is fed a mixture of air and gas through the conduit 70 and throttle valve 71. Combustion takes place in the chamber 69 and the flame is projected into the tube 72 which extends inwardly from the compartment 69 and enters the recirculatory system, thus the flame contained in the tube 72 (Figure 3) serves to heat the air which leaves the main portion of the oven at the exhaust conduit 65 and enters the intake conduit 74 of the recirculatory system. The throttle valve 71 may be conveniently controlled by a solenoid, as is well known in the art.

Figure 3:
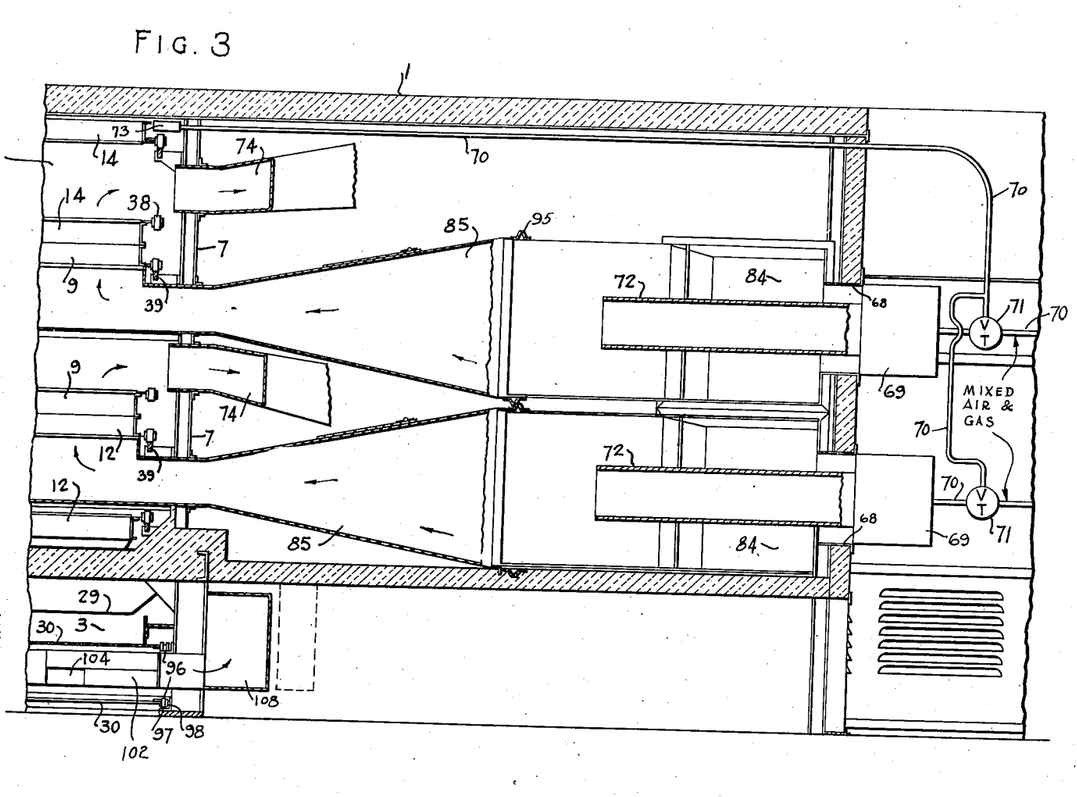
Figure 3 is a sectional view taken along the line 3—3 in Figure 1, and in a different position from Figure 2 in order to show the burners.

Provision is also made in the burner for the admission of fresh air to make up for the losses of the circulatory volume of air which will inevitably appear within the system. Thus, heated air passes inwardly through the intake ducts 62 to positions under the perforated baffle plates 56, and this air is drawn up through the openings 60 by the fan in the compartments 67, which will be hereinafter described. The temperature to which the incoming air is heated may be automatically controlled through the throttle valve 71 by one or more thermostats 73 mounted in any suitable manner within the oven, as indicated in Figure 3. While these thermostats may be adjusted, as a result of excessive temperature, to entirely cut off the supply of gas admitted through the valve 71, I prefer that the adjustment be such as simply to throttle down or reduce the supply of gas. Thus the burner tube 72 is being continually heated, but at varying rates, depending on the temperature in the oven.

Figure 10:
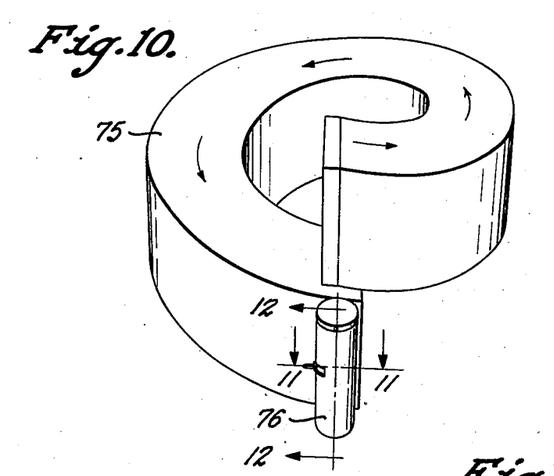
Figure 10 is a perspective view of the spiral fines separator and collector.
Figure 11:
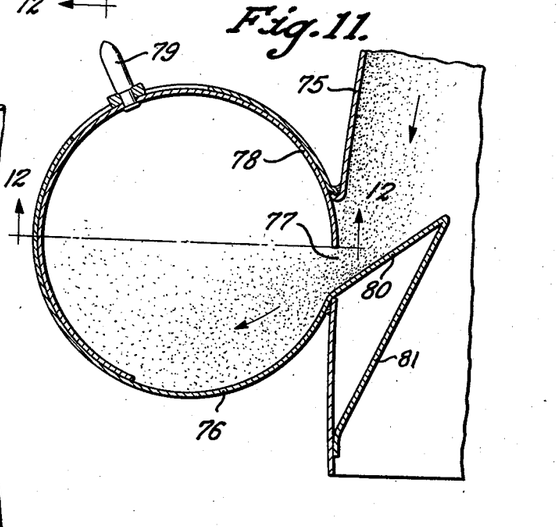
Figure 11 is an enlarged sectional view taken on the line 11—11 of Figure 10, to show the details of the fines collector.
Figure 12:
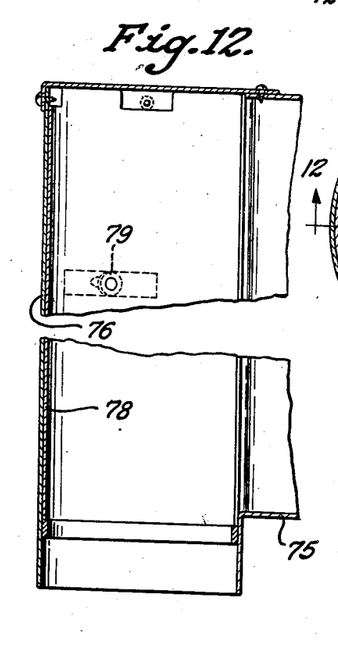
Figure 12 is a sectional view taken on the line 12—12 of Figure 10, in the axis of the fines collector. This figure is considerably enlarged.

It is pointed out hereinbefore that after the air is heated between burner 72 in each recirculating system, the heated air is delivered from the duct 66 (Figure 1) into the gable-roofed intake conduit 62 (Figure 4) where the heated air passes up through the perforations 60 of the baffle plates 56 and through each tier of double baskets 9, 12 and 14 depending on which group of the intake conduit 62 is being considered. The air then flows through the mesh at each end of the double basket and passes out through the side of the oven at the exhaust conduit 65 into the pipe 74 (Figure 1) of the recirculatory system. In order to remove the fine particles of cereal which will inevitably appear in the heated air as it passes up through the basket, there is provided a so-called fines separator and collector in each recirculatory system. A perspective view of this device is shown in Figure 10, and it will be seen that the separator 75 takes the form of a vertically descending spiral with the inlet at the top and the outlet at the bottom. It is preferably of hollow rectangular configuration, made of sheet metal, and is connected at the bottom to a cylindrical can element 76 (Figure 11). The interior of the can communicates with the separator 75 through an opening 77, which may be closed by an arcuate slide 78 and is, in turn, manipulated by a handle 79. There is a lip 80 projecting into the separator 75 from the can 76, this lip being reinforced preferably by a sheet member 81. A complete description of the operation of the fines separator and collector including its relation to the remainder of the recirculatory system is given under a separate heading.

For forcing the air through the spiral separator 75 there is provided a fan 82 (Figure 1), which communicates through a conduit 83 with the bottom of the separator 75 which is below the lip 80. The air is taken through the eyelet of the fan and expelled at the periphery thereof through a conduit 84, which opens into a larger duct 85 communicating with each adjacent pair of intake conduits 62. It has been pointed out that the fresh air coming in contact with the tube 72 of the gas burner also finds access through the intake conduits 62.

It will be understood that the compartments 67, as well as the main portion 1 of the oven, are provided with heavy layers of heat insulation material. The fans of the separator and burner compartments may be actuated by a single motor, but I prefer to employ as many motors 86 as there are fans, as indicated in Figure 1.

From the foregoing it is evident that I have described a closed circulatory heated air system in which the fresh air is initially introduced in any suitable manner at the burner, and after being heated by passing over the tube 72, it flows into the intake conduits 62, up through the openings 60 and through each double basket, finally passing through the exhaust conduits 65 and through the separator 75, after which additional heated air is added, if necessary, the air finally being reintroduced through the conduits 85 to the intake conduits 62.

*Flake-tossing operation*

It was pointed out hereinbefore that the openings in each baffle plate 56 (Figure 13) are arranged in staggered groups, and the openings in each group are also staggered in relationship. Assume that a three-partitioned basket is being moved over the baffle plate 56 by the chains 10; and that the front edge of the double basket has just approached the nearest line of openings. The heated air which is forced up through this line of openings causes the flakes in each basket to be tossed upwardly from one side of the basket to the other side, the air continuing its travel through the upper screen of the basket to the exhaust conduits 65. This condition is shown in Figure 17. As the basket begins to leave the first row of openings, the flakes which have been tossed to one side of the basket are now moved or tossed to the opposite side. This condition is shown in Figure 18. Thus as each basket passes over the apertured U-shaped section 57 the flakes are tossed from one side of the basket to the other side and then returned to their initial position. During this tossing operation the heated air which passes upwardly through the baskets bakes and toasts the flakes, lending to them a rich brown color and rendering them extremely friable and palatable. The flakes are very crisp and tender, and on occasion small parts thereof might be broken off. These particles are usually termed "fines."

In addition to the transverse tossing effect, there is a longitudinal tossing operation which is diagrammatically illustrated in Figures 19 and 20. As each three-partitioned basket passes over the U-shaped section 57, the openings in the latter cause the heated air to toss the flakes from one end of each basket compartment to the other end. The flakes remain at this end of the basket compartment during the whole time that the basket is passing over the apertured member but subject to the transverse tossing described in connection with Figures 17 and 18. As the triple basket moves to the next U-shaped section 57, the flakes are caused to toss to the opposite end of each compartment, due to the fact that the openings in the member 57 have a staggered relation with respect to the openings in the adjacent member 57, as can be seen in Figure 13. This second tossing effect from end to end of the basket compartment is shown in Figure 20. Thus as the basket moves from one strip 57 to the next strip, the flakes are tossed not only from side to side of the basket and back, but also from end to end of each basket and back, exposing both sides of each flake to the toasting effect of the heated air. It is apparent that the members 57 may be positioned as close together as desirable so as to offer any desired rate of tossing effect, either from side to side of the basket or from end to end or both.

Figure 15:
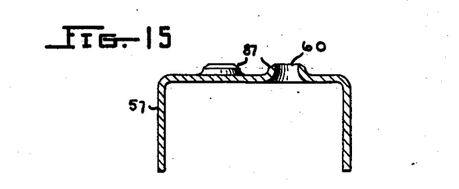
Figure 15 is a small fragmentary sectional view of the orifices or perforations formed in the baffle plate shown in Figure 13.

It is also apparent that the openings in the baffle plate 56 might be arranged in many different ways in order to provide any desired direction of tossing of the flakes at any desired time or sequence. In order that the frictional loss introduced by the air passing through the openings 60 will be at a minimum, I may shape these openings to give a nozzle effect, as is indicated in Figure 15. The openings may be conveniently surrounded by an upstanding flange 87 formed at the time the openings are made.

*Fines separation and recirculation of air*

It was pointed out above that the toasting effect within the oven renders the flakes very brittle, so that on occasion small particles of the flakes may be combined with the heated air as it enters the exhaust conduits 65. It is necessary to remove these particles or fines because if the air were recirculated with these particles in suspension, the upward movement of the air through the baskets might introduce deleterious effects into the tossing action. The air, after leaving the exhaust conduits 65, is forced by the main blowers or fans 82 through the spiral separator 75, which causes the particles or fines to move against the outer periphery of the separator and therefore to separate themselves from the heated air. As these two concentric columns of air and particles move downwardly through the separator, the outer column is intercepted by the lip 80 (Figure 11), which serves to skim off the particles but to permit the inner column of air to pass by and finally to find its way through the fan 82 to the intake conduits 64.

Figure 7:
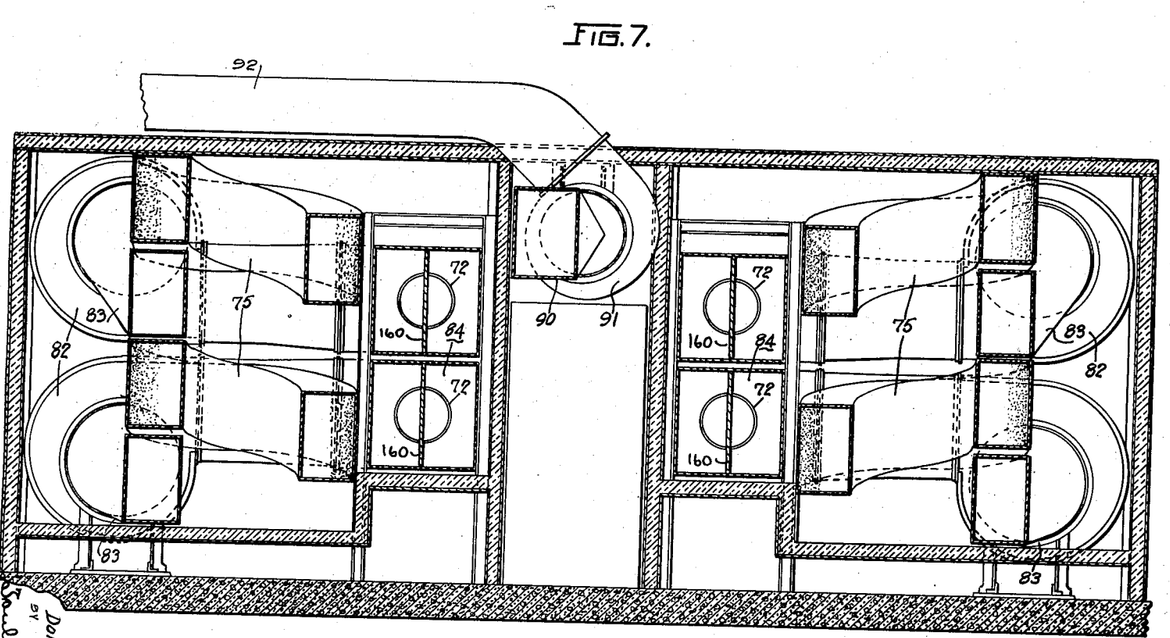
Figure 7 is a sectional view taken along the line 7—7 in Figure 1, to show the spiral shape of the fines separator.

Assuming that the handle 79 has been moved to open the slide 78, the particles collected by the lip 80 will travel into the can or collector 76. The lower end of the can 76 communicates through a duct 88 (Figure 1) which leads to a header 89, and through a horizontal duct system 90 into the eye of a centrifugal fan 91. The casing of the fan 91 exhausts through a conduit 92 (Figure 7). As shown in Figure 1, the header 89, conduit 90 and fan 91 may be positioned between the inner walls of the compartments which house the fines separators and the burners. It will be noted in Figure 1 that since there are four separators employed, four ducts 88 are provided, which all lead to the common header 89, and since there is only one fan to remove this cereal-laden air, the conduit 90 is of sufficiently large size to accommodate all of the air carried by the four ducts 88. A motor 93 may be provided to drive the fan 91. It will be explained hereinafter that the header 89 is also connected to the exhaust system for the air in the cooling chamber so that the fan 91 exhausts the cool air as well as maintaining each of the four separators substantially empty of fines. The small amount of heated air which is exhausted together with the cereal particles may be re-added to the circulating system by introducing additional fresh air at the burners 69. It is apparent that the slide 78 may be so adjusted by the handle 79 as to control the amount of air which leaves the circulatory system and passes through the can 76 into the header 89, and is finally exhausted through the conduit 92. Thus the slide 78 constitutes one of the adjustments by which the amount of circulatory air may be controlled without having to add additional air, and to that extent the slide can assist in controlling the relative humidity of the circulatory air.

It will be understood that as the flakes are presented to the oven, they have been previously cooked in a liquid flavoring material so that they arrive at the oven in a damp condition. During the baking and toasting process the heated air takes up this moisture in suspension, tending after a while to greatly increase the humidity of the air and thus reduce its toasting and baking effects. By exhausting predetermined portions of the circulatory air through the fan 91 and carrying with them the fines or small particles, room is made in the circulatory system for additional fresh and dry air. Thus the humidity of the heated air can be readily controlled. It will be noted that inasmuch as the cereal-laden air is collected in the can 76 and eventually evacuated through the fan 91, only the pure air from which the cereal particles have been separated passes over the burners for recirculation through the oven. Consequently, the burners are called upon to heat only that portion of the air which does not contain any cereal particles or fines, and to this extent the present system represents an improvement over the system shown in my copending application referred to hereinbefore. In that application it will be noted that the separation of the fines from the air takes place after the cereal-laden air passes over the burners, so that the heat applied to the cereal in suspension is permanently lost when the cereal particles are extracted and collected.

For practical reasons it is desirable to form the spiral separator 75 out of two or more lengths of conduit, and it is apparent that since this member is subjected to the heat of the air delivered through the exhaust conduits 65, some provision must be made to permit the ends of the spiral separator 75, where they come together, to move with respect to one another without leaving an opening through which the heated air or the suspended cereal particles can escape. In accordance with another feature of my invention I have provided a flexible joint which serves this purpose, and is illustrated in Figure 9. As will be noted, the rectangular end of one section of the spiral separator 75 has dimensions such as to fit snugly within the rectangular end of the adjacent section of the spiral separator. Strips 94 of Sylphon or bellows material are arranged between the overlapping ends of the spiral separator 75 and secured to these ends in any suitable manner, for example, by spot welding. This material may take an angular configuration extending outwardly from the separator, and follows the joint around the complete boundary of the separator. It will be evident that as the sections of the separator 75 become heated one section will telescope further into the other section, and during this movement the hermetical seal at the joint is maintained by the Sylphon 94.

In Figure 8, I have illustrated a convenient way in which two closely adjacent pipes having joints located in approximately the same position and which joints are hermetically sealed by a flexible member, may be brought together without interfering with the Sylphon joint. It may be necessary in order to conserve space to position some of the conduits of the recirculatory system quite close to one another. Such a condition would arise where two circulating systems are positioned one over the other and compactly contained in a single compartment 67. In such a case, instead of giving to the flexible joint an angular form in which the legs are symmetrical as illustrated in Figure 9, these legs are purposely made unsymmetrical as indicated in Figure 8, so as not to interfere with one another in places where the joints between conduits are directly opposite and positioned quite close to one another. A suitable place for the improved joint shown in Figure 8 is at the place of connection between the conduit 84 and the outlet of the fan 82. It will be appreciated that there are two such conduits 84 in each chamber 67, positioned one over the other with only a little space between conduits. As shown in Figure 8, this space may be maintained by an angle iron spacing member 95'. The joints between the ends of each conduit may be connected together by a Sylphon member 95 having legs of different lengths and so arranged that one Sylphon member will avoid contact with the other Sylphon member.

It will be understood that each of the members 95 as shown in Figure 8, comprises a section of a flexible joint which extends entirely around a conduit regardless of whether the conduit is of circular or rectangular cross-section. In case of the conduit 84, this configuration is that of a rectangle which conforms to the configuration of the outlet of the fan 82.

After the flakes have been subjected to the tossing heat treatment due to the action of the heated air passing through the circulatory system, including the fines separator, they finally arrive in the baskets 12 of the lower flight, from which they are dumped as these baskets pass over the left-hand sprocket (Figure 4), through the chute 29, into the cooling compartment 3, which is located directly under the oven.

Cooling compartment

The cooling compartment is of substantially the same length as the oven, and contains at each end the sprocket 32 over which rotates the articulated perforated plates 30. These plates are carried in any suitable manner at each end by a number of rollers 96 (Figure 22) which travel on tracks 97, bracketed as at 98 to the sides of the cooling chamber. The rollers 96 are preferably of the character described in connection with Figure 27, and contain an annular core for receiving lubricant through an Alemite connection. A chain 99 may be employed to propel the rollers over the tracks, this chain being actuated by the sprockets 32. A motor 100, through suitable reduction gearing and proper mounting with respect to the oven, may be employed for driving these sprockets. The shafts on which the sprockets 32 are mounted are preferably journalled in ball bearings secured to the frame of the machine in any suitable manner.

Figures 21, 23:
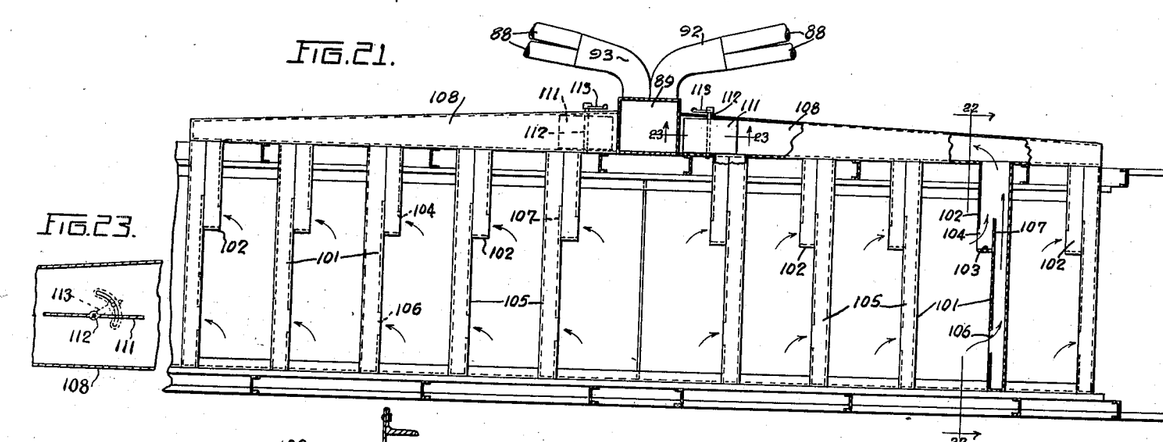
Figure 21 is a plan view looking down on the cooling ducts which are positioned in the cooling compartment.
Figure 23 is a fragmentary sectional view taken along the line 23—23 in Figure 21, to show the details of a damper positioned in one or both of the cooling headers.
Figure 22:
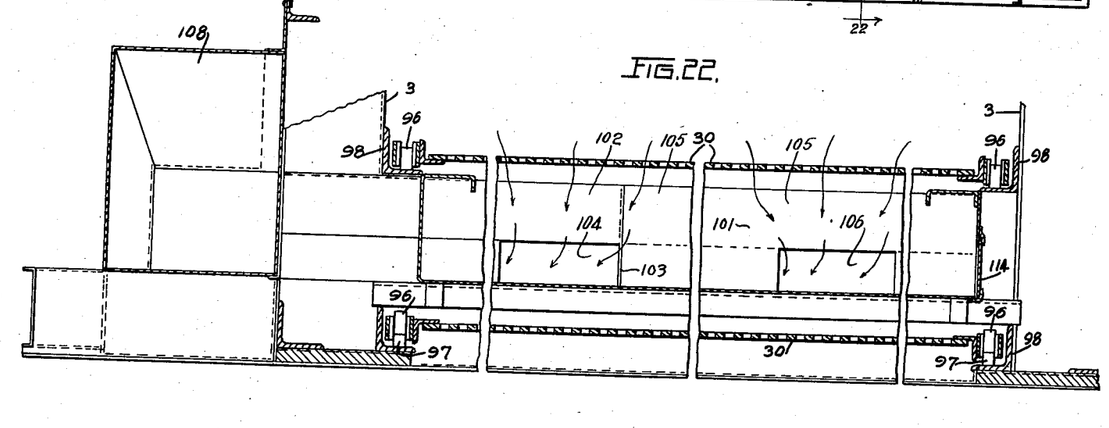
Figure 22 is a section considerably enlarged and taken along line 22—22 in Figure 21, to show the details of the cooling ducts.

Extending under the entire length and width of the articulated plate conveyor 30 there is a cooling compartment, across which extends a number of equi-distantly spaced exhaust ducts. These ducts are made of sheet metal and have inclined roofs, as indicated at 101 (Figure 4), one half of each duct being of much shorter length than the other half, as can be plainly seen in Figure 21. The shorter length portion 102 is closed at its inner end, as indicated at 103, and is provided with an opening 104 in the side of the duct. The longer length portion 105 of the duct is closed at one end, and contains an opening 106 at a position intermediate between the closed end 103 of the duct portion 102 and the closed end of the longer duct portion 105.

Where the two ducts join together there is a baffle plate or partition 107 which extends outwardly (i. e. toward the side of the machine) away from the closed end 103. Thus the two duct portions 102 and 105 are completely open to one another beyond the partition 107. The general arrangement of the two duct portions 102 and 105, and particularly the position of the openings 104 and 106 with respect thereto, is shown in Figure 22. The duct portions 102 and 105 terminate at the end where they come together in a relatively large header 108 having a triangular configuration both in height and also in width, as indicated in Figure 21, this header communicating at its central portion with the header 89 referred to in connection with Figure 1.

It was pointed out that from this header 89 there extended two groups of double ducts 88 communicating with the can 76 of the fines separator 75, and in addition this header had access to the exterior of the machine through the fan 91. Consequently, the rotation of the fan 91 serves not only to exhaust the contents of the can 76 but also to exhaust the air contained in the cooling compartment and passing through the openings 104 and 106 of the ducts 102 and 105. It will be noted that this exhaust of the air takes place in a staggered manner because the opening 104 is positioned on the opposite side of the cooling compartment from the opening 106 and is also positioned in a different transverse plane. This arrangement assures a more diffused exhausting of the air.

The air for cooling is taken in through an opening 109 which extends over the entire length of the cooling chamber and along one side of the machine. In this opening there is mounted, in any suitable manner, a refrigeration unit or other cooling accessory, for example, a series of longitudinally extending pipes 110 through which cold water procured from any suitable source is circulated. The opening 109 is positioned just above the level of the articulated plate conveyor so that air which is cooled by the pipes 110 is drawn into the compartment, due to the exhaust effect of the fan 91. This air passes downwardly through the openings in the plate conveyor 30, and is finally exhausted through the openings 104 and 106 of the ducts 102 and 105. Consequently, as the toasted flakes are dumped by the baskets 12 as they pass around the lower left-hand sprocket 13 (Figure 4), through the chute 29, the toasted flakes are deposited on the plate conveyor 30 and cool air is passed over and between the flakes. By the time a given group of flakes has passed over the entire length of the conveyor 30 and has been subjected to this cool air treatment, the heat has been entirely abstracted from the flakes, leaving the latter in a cool and crisp condition. When the flakes reach the position on the right-hand sprocket (Figure 4) they are dumped through the chute 33, into any suitable form of receptacle, or directly into the succeeding machine in the processing line. The purpose of providing the ducts 102 and 105 with an inclined roof is to prevent any of the cereal particles which might fall between the openings of the articulated plate 30 from being deposited on top of these ducts and remaining there in position. It is obvious that with the inclined roof or top any material which drops from the articulated plate will immediately flow over the top, and hence will not lodge permanently on top of the ducts.

Within the header 108, on each side of the header 89 (Figure 21), there may be provided a damper 111, rotatable on a shaft 112 by actuating a handle 113. It is obvious that these dampers 111 can control the amount of cool air flowing through the header 108 and therefore can determine the rate at which the flakes passing on the plate conveyor 30 are being cooled. The details of these two dampers are shown in Figure 23, and are for the most part self-explanatory. If desired, there may be provided in the wall of the cooling compartment opposite the header 108 a number of slides, indicated at 114, which may be opened for the entrance of cleaning brushes, inspection, etc. The header 89 may also be provided with a suitably positioned clean-out slide (not shown).

From the foregoing it is evident that I have provided an improved oven and cooling structure which is not only of a compact design in that the oven is positioned directly over the cooler, but I have also arranged the various operating parts so as to be actuated with the minimum number of motors and therefore calling for minimum actuating mechanism. It has been pointed out that the three flights of baskets are operated by a single motor 151 through suitable mechanical connections, and further that only a single motor 93 and fan 91 are required to exhaust the air in the cooling compartment and to continuously empty the collectors 76 of the fines separators 75. I have also disclosed an improved arrangement of heating the air in the oven by which the dust or fines have been collected and eliminated before the air is heated for recirculation.

*Electrical control of the oven and cooler structure*

The burners 69 are supplied with gas and compressed air from the pipe 70 through the throttle valve 71. The latter preferably may be operated and controlled by an electrical solenoid. For starting the burners an igniter, such as a spark plug or similar element, may be used to advantage as this element lends itself to an electric control.

Figure 28:
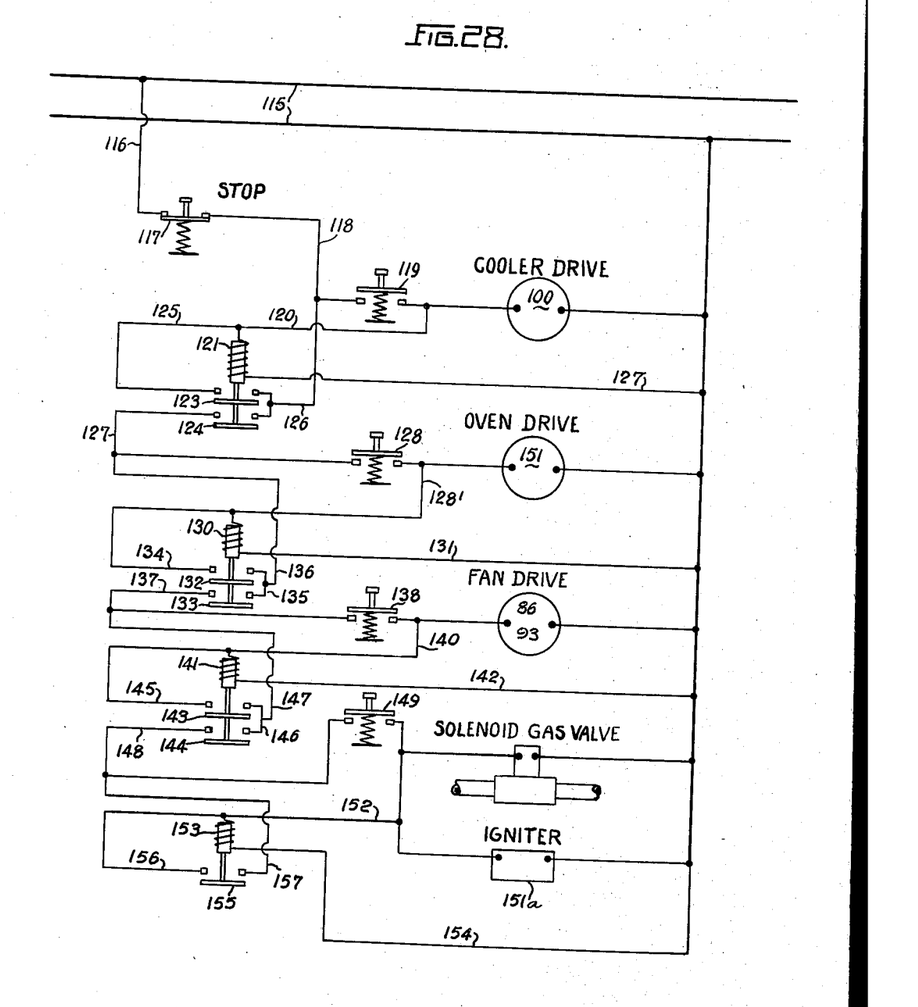
Figure 28 is an electrical circuit showing one of the many ways in which the different motors employed for driving the various mechanism can be sequentially started.

Referring to Figure 28, the numeral 115 designates the mains of an electric circuit. A line 116 is taken from the mains 115, through a stop switch 117, through a conductor 118 and cooler drive switch 119, the cooler drive motor 100, back to the other side of the mains 115. A conductor 120 is taken from one of the contacts of the switch 119, through the coil of an electromagnet 121, back to one side of the mains 115 and through the conductor 122. The core of the electromagnet 121 is provided with a pair of armatures 123 and 124, respectively, the upper one of which is adapted to make contact with a wire 125 which is connected to one end of the electromagnet 121. The armature 123 is also adapted to make contact with a wire 126 which is connected to the conductor 118. The armature 124 is adapted to make contact with a wire 127 and also with the wire 126, the wire 127 passing through an oven drive switch 128 and the oven drive motor 151 to one side of the mains 115. A connection 128' is taken from the switch 128 to one end of an electromagnet 130, the other end of which is connected through a conductor 131 to the mains 115.

The core of the electromagnet 130 has a pair of armatures 132 and 133, respectively. The armature 132 is adapted to contact with a wire 134 which is connected to the coil of the electromagnet 130. The armature 132 is also adapted to make contact with a wire 135 which is connected through a conductor 136 to the wire 127. The armature 133 is adapted to make contact with a wire 137 which passes through a fan drive switch 138, and through fan drive motors 86 and 93 to one side of the mains 115. A connection 140 is taken from the fan drive switch 138 to the coil of an electromagnet 141, the other end of which is connected through a conductor 142 to the mains 115.

The core of the electromagnet 141 is provided with a pair of armatures 143 and 144. The armature 143 is adapted to make connection with a conductor 145 which is connected to the upper end of the electromagnet 141. The armature 143 is also adapted to make connection with a conductor 146, which connects through a wire 147 with the wire 137. The armature 144 is adapted to make connection with a wire 148 which passes through a switch 149 and the throttle valve 71, to the mains 115. Shunted across the throttle valve 71 there is an igniter 151a. A connection 152 is taken from one side of the switch 149 to the coil of an electromagnet 153, the other side of the coil being connected through a conductor 154 to the mains 115. The core of the electromagnet 153 has an armature 155 which is adapted to connect wtih a wire 156 connected to one end of the electromagnet 153. The armature 155 is also adapted to make connection with a wire 157 which is connected to the wire 148.

In the operation of the circuit shown in Figure 8, assuming that the emergency or stop switch 117 remains closed, the cooler drive switch 119 is manually depressed. This will start the cooler drive motor 100 and will also cause energization of the electromagnet 121. As the armature 123 is pulled upwardly it provides a holding circuit so that the switch 119 can be released. The armature 124 provides a circuit through the emergency switch 117 and the conductors 118 and 127, so that if the switch 128 is depressed the oven drive motor 151 will be energized. Depressing the switch 128 energizes the electromagnet 130, causing the armature 127 to make contact with the wires 134 and 136, thus establishing a holding circuit for the switch 128.

The lower armature 133 carries the circuit through the stop switch 117 to the switch 138 so that as the latter is manually depressed the oven fan drive 86 and the cooler fan drive 93 are actuated. The depressing of the switch 138 causes the electromagnet 139 to establish a holding circuit at the armature 136 and the lower armature 137 carries a connection from the switch 117, through the wire 148, to the switch 149. Consequently, as the latter is depressed the solenoid throttle valve 71 is actuated to admit air and gas to the burners 69, and the igniter 151 is also energized to ignite the gas. At the same time the switch 141 establishes a holding circuit at the armature 155 through the electromagnet 153.

It is apparent that in order to start all of the motors of the oven and cooler structure, also the burners, it is necessary only to depress the switches 119, 128, 138 and 149 in succession, or at any predetermined time interval between the actuation of the switches. If the switch 117 were depressed this would, in effect, open up all of the circuits throughout the entire machine, causing the conveyors and the fans to come to rest and closing the gas and air valve 71.

While I have described a convenient system in Figure 28 for initiating the various drives of my improved oven and cooler structure, it will be understood that automatic switches could be substituted for the manual control system, and further, that if desired any of the drives could be energized in a different sequence from that shown and described.

It may be desirable, on occasion, to provide zones of greater heating or cooling effects as the flakes move either through the oven or through the cooling chamber. A convenient way of obtaining this result, insofar as the heating effects are concerned, is to provide the conduit 84 (Figure 1) with an intermediate partition 160 which divides the interior of the conduit 84 into two passageways. A damper 161 may be pivoted within the conduit 84, and controllable in any suitable manner from the exterior to regulate the relative proportions of the heated air passing on either side of the partition 160. As the damper 161 is moved downwardly (Figure 1), the left-hand passageway of the conduit 84 begins to close so that a greater proportion of the heated air is admitted to the right-hand passageway of the conduit 84. Thus, greater amounts of heated air are admitted to the oven in the zone directly in front of the right-hand passageway of the conduit 84 than in the zone directly to the left of this passageway. The same partitioning of the inlet conduit 84 may be applied to all of the intake units so that as the flakes progress through the oven they are subjected to zones of greater or less heating effects, depending on the position of the damper 161 of the respective air-recirculating systems.

The same or a similar provision may also be applied to the exhaust mechanism in the cooling chamber, in which dampers movable from the exterior may be applied to any or all of the openings 104, 106 (Figure 21), causing greater cooling effects in certain zones than in others as the flakes progress through the cooling chamber.

It will be understood that I desire to comprehend within my invention such modifications as come within the scope of the claims and the invention.

Having thus fully described my invention, what I claim as new and desire to secure by Letters Patent, is:

1. In an oven for toasting cereal flakes, means for conveying the flakes through the oven, means for passing heated air through the flakes as they move through the oven, means for withdrawing the air from the oven and reheating and returning the same to the oven through an intake duct, said duct being partitioned, and means for controlling the relative proportions of the heated air entering the passageways between the partitions of the duct, whereby the distribution of the heated air throughout the oven may be controlled.

2. In an oven for toasting cereal flakes, means for conveying the flakes through the oven, means for passing heated air through the flakes as they move through the oven, means for heating the air and for circulating the heated air through the oven, said means including an intake duct containing a heater, said duct being divided into a plurality of passageways, and a damper for controlling the entrance to each passageway whereby the distribution of the heated air passing through the duct and the distribution of the heated air throughout the oven are controlled.

DONALD E. MARSHALL.